US011056000B2

(12) United States Patent
Lamkin et al.

(10) Patent No.: US 11,056,000 B2
(45) Date of Patent: Jul. 6, 2021

(54) EMERGENCY UAV METHOD AND APPARATUS (71) Applicant: Intel Corporation, Santa Clara, CA (US)

(72) Inventors: Andrew F. Lamkin, Beaverton, OR (US); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 229 days.

(21) Appl. No.: 16/307,373

(22) PCT Filed: Jul. 26, 2016

(86) PCT No.: PCT/US2016/044090
§ 371 (c)(1),
(2) Date: Dec. 5, 2018

(87) PCT Pub. No.: WO2018/022021
PCT Pub. Date: Feb. 1, 2018

(65) Prior Publication Data
US 2019/0259280 A1 Aug. 22, 2019

(51) Int. Cl.
*G08G 1/087* (2006.01)
*G08G 1/16* (2006.01)
(Continued)

(52) U.S. Cl.
CPC ............ *G08G 1/162* (2013.01); *B64C 27/08* (2013.01); *B64C 39/024* (2013.01); *B64D 45/00* (2013.01);
(Continued)

(58) Field of Classification Search
None
See application file for complete search history.

(56) References Cited

U.S. PATENT DOCUMENTS 8,874,360 B2 * 10/2014 Klinger .................. G08G 5/003
                                                                 701/301
10,223,914 B2 * 3/2019 Park ........................ G01S 19/14
(Continued)

FOREIGN PATENT DOCUMENTS

| KR | 101690566 B1 * | 1/2017 |
| KR | 101774313 B1 * | 9/2017 |
| WO | WO2014-080388 A2 | 5/2014 |

OTHER PUBLICATIONS

International Search Report and Written Opinion dated Apr. 25, 2017 for International Patent Application No. PCT/US2016/044090, 20 pages.

*Primary Examiner* — Todd Melton
(74) *Attorney, Agent, or Firm* — Schwabe, Williamson & Wyatt, P.C.

(57) ABSTRACT

Apparatus, method and storage medium associated with UAV assisted emergency responses are disclosed herein. In embodiments, an UAV may comprise a flight controller to control at least one or more engines of the UAV to navigate the UAV to condition road traffic for an emergency vehicle on emergency en route to a destination, wherein to condition road traffic, the flight controller is to receive navigation data of the emergency vehicle, and in response, control at least the one or more engines to navigate the UAV in advance of the emergency vehicle, to alert road traffics ahead of the emergency vehicle of pending transit of the emergency vehicle. Other embodiments may be disclosed or claimed.

23 Claims, 6 Drawing Sheets (51) Int. Cl.
    *B64C 39/02*     (2006.01)
    *B64D 47/02*     (2006.01)
    *G08G 1/0969*     (2006.01)
    *B64D 47/08*     (2006.01)
    *G05D 1/02*     (2020.01)
    *G05D 1/08*     (2006.01)
    *G08G 1/0967*     (2006.01)
    *B64C 27/08*     (2006.01)
    *B64D 45/00*     (2006.01)

(52) U.S. Cl.
    CPC ............. *B64D 47/02* (2013.01); *B64D 47/08* (2013.01); *G05D 1/0285* (2013.01); *G05D 1/0808* (2013.01); *G08G 1/087* (2013.01); *G08G 1/0969* (2013.01); *G08G 1/096791* (2013.01); *B64C 2201/024* (2013.01); *B64C 2201/027* (2013.01); *B64C 2201/12* (2013.01); *B64C 2201/122* (2013.01)

(56) References Cited

U.S. PATENT DOCUMENTS

| | | | |
|---|---|---|---|
| 2009/0319096 A1* | 12/2009 | Offer | H04L 67/12 |
| | | | 701/2 |
| 2015/0370251 A1* | 12/2015 | Siegel | B64D 1/22 |
| | | | 701/2 |
| 2016/0001884 A1 | 1/2016 | Fleck | |
| 2016/0012730 A1 | 1/2016 | Jarrell | |
| 2016/0059962 A1 | 3/2016 | Abuelsaad et al. | |

\* cited by examiner

EMERGENCY UAV METHOD AND APPARATUS

CROSS REFERENCE TO RELATED APPLICATIONS

The present application is a national phase entry under 35 U.S.C. § 371 of International Application No. PCT/US2016/044090, filed Jul. 26, 2016, entitled "EMERGENCY UAV METHOD AND APPARATUS", which designated, among the various States, the United States of America. The entirety of the PCT/US2016/044090 Application is hereby incorporated by reference.

TECHNICAL FIELD

The present disclosure relates to the fields of emergency services and unmanned aerial vehicles (UAV). In particular, the present disclosure is related to method and apparatus for emergency UAV (also referred to as "drone").

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Public Safety includes emergency management agencies, law enforcement agencies, fire departments, rescue squads, and Emergency Medical Services (EMS). Emergency service land vehicles (hereinafter, simply emergency vehicles) in emergency use are routinely tasked with reaching a destination quickly, using whatever means they can to get to the scene including bending or breaking traffic patterns and conventions. To signal their presence to other vehicles, emergency vehicles typically employ sirens, horns, and lights attempting to draw as much attention as possible. The risks in this inherently dangerous mode of operation are amplified in dense populated areas, e.g., metropolitan areas in the United States, where to date there are still no safety standards for many emergency vehicles, including ambulances which are often heavily modified.

In the United States, using data from 1992 through 2011, there was an average of 4,500 crashes involving ambulances alone. In 2012 alone in the United States, 131 people were killed in crashes involving emergency vehicles. Of these nearly one hundred involved an emergency vehicle in emergency use with lights blinking and sirens sounding. These crashes are tragic and highly publicized events which can create significant financial, legal, and public opinion repercussions for emergency services even when not at fault.

With an estimated 50,000 ambulances on the road in the United States (and likely similar numbers in other jurisdictions of similar sizes) each day, and many more police and fire vehicles, any improvement in the safety of these emergency service vehicles is a much needed improvement.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatus, method and storage medium associated with UAV assisted emergency responses are disclosed herein. In embodiments, an UAV may comprise a transmitter-receiver arrangement to transmit and receive communication signals; one or more engines to provide propulsive force for the UAV; and a flight controller coupled to the transmitter-receiver arrangement and the one or more engines. The flight controller may be configured to control at least the one or more engines to navigate the UAV to condition road traffic for an emergency vehicle on emergency en route to a destination, wherein to condition road traffic, the flight controller is to receive via the transmitter-receiver arrangement navigation data of the emergency vehicle, and in response, control at least the one or more engines to navigate the UAV in advance of the emergency vehicle, to alert road traffics ahead of the emergency vehicle of pending transit of the emergency vehicle. In embodiments, the UAV may also be configured to modify traffic controls along the route ahead of the emergency vehicle to favor the emergency vehicle. In embodiments, the UAV may also be configured to report the road traffic information ahead of the emergency vehicle back to the emergency vehicle. In embodiments, the UAV may also be configured to suggest an alternate route to the emergency vehicle.

In embodiments, an emergency service vehicle may comprise a transmitter-receiver arrangement to transmit and receive communication signals; and a vehicle control system coupled to the transmitter-receiver arrangement. The vehicle control system may be configured to use an UAV to condition road traffic for the emergency vehicle when it is on an emergency en route to a destination; wherein to use the UAV to condition road traffic, the vehicle control system is to transmit, via the transmitter-receiver arrangement, navigation data of the emergency vehicle to the UAV, directly or a via a dispatch station; wherein in response, the UAV is to navigate the UAV in advance of the emergency vehicle, to at least alert road traffics of pending transit of the emergency vehicle.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A). (B), (C), (A and B). (A and C), (B and C), or (A, B and C).

The description may use the phrases "in an embodiment." or "in embodiments," which may each refer to one or more of the same or different embodiments. Furthermore, the terms "comprising," "including," "having," and the like, as used with respect to embodiments of the present disclosure, are synonymous. The terms "motor" and "engine" are synonymous unless the context clearly indicates otherwise.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs having one or more machine instructions (generated from an assembler or from a high level language compiler), a combinational logic circuit, and/or other suitable components that provide the described functionality.

Figure 1:
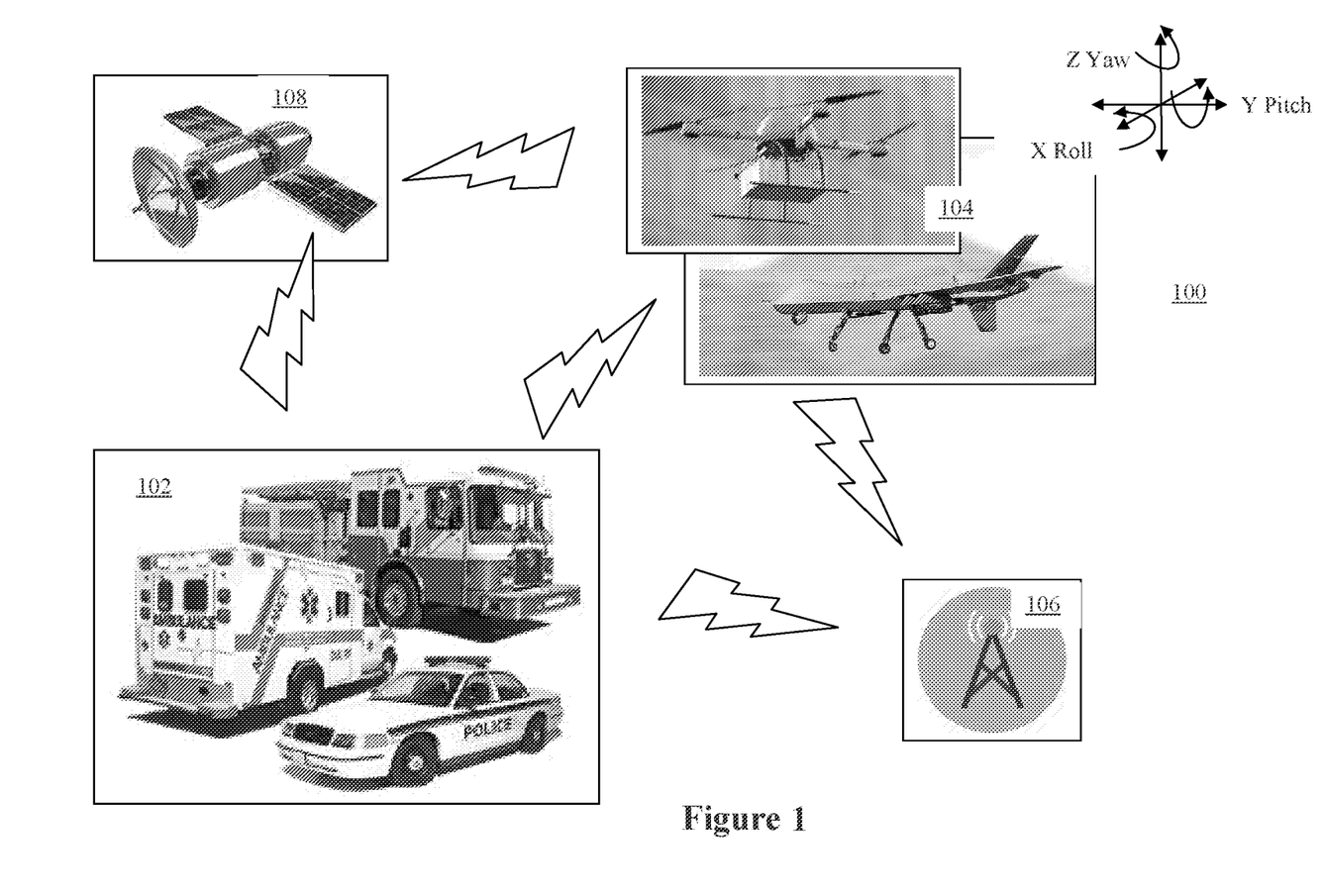
FIG. 1 illustrates an overview of an UAV assisted emergency response system, in accordance with various embodiments.

Referring now to FIG. 1, wherein an overview of an UAV assisted emergency response system, in accordance with various embodiments, is shown. As illustrated. UAV assisted emergency response system 100 may include a number of emergency vehicles 102 and a number of UAVs 104. UAVs 104 may be configured to assist emergency vehicles 102 while emergency vehicles 102 are on emergency en route to destinations, to reduce the likelihood of emergency vehicles 102 getting involved in accidents with other vehicles. In embodiments, UAVs 104 may navigate/operate in advance of the emergency vehicles 102 when emergency vehicles 102 are on emergency en route to destinations, to condition road traffics for emergency vehicles 102. In embodiments, UAVs 104 may navigate/operate in advance of emergency vehicles 102 by a pre-determined or dynamically determined amount of distance. In embodiments, to condition road traffics along the route may include alerting road traffics ahead of emergency vehicles 102 of pending transit of emergency vehicles 102, modifying traffic controls along the route ahead of emergency vehicles 102 to favor emergency vehicles 102, reporting traffic conditions ahead of emergency vehicles 102 back to emergency vehicles 102, and/or suggesting alternative routes to emergency vehicles 102.

As illustrated, emergency vehicles 102 may be a fire engine, a law enforcement or police vehicle, or an emergency medical service vehicle (also may be referred to as an ambulance). In alternate embodiments (not shown), emergency vehicles 102 may be an emergency roadside assistance vehicle (also may be referred to as a tow truck), a forest/park ranger vehicle, a Federal Emergency Management Assistance (FEMA) vehicle, a national guard vehicle on emergency/disaster relief, and other emergency vehicles of the like.

As illustrated, UAV 104 may be a quadcopter propelled by rotating blades driven by corresponding motors, or an unmanned winged aircraft with flaps, elevators, stabilizers, rudders, and so forth, propelled by a jet engine. In alternate embodiments (not shown), UAV 104 may be an unmanned single motor helicopter, a dual copter, a tricoper, and so forth. Regardless of the propulsion system each of UAVs 104 may be controlled with a desired amount of roll, pitch, and/or yaw to navigate in advance of an emergency vehicle 102 being assisted.

In embodiments. UAVs 104 may be dispatched from various bases to assist the en route emergency vehicles 102. In embodiments, there may be a one-to-one relationship between UAVs 104 and emergency vehicles 102. That is, each emergency vehicle 102 may be equipped with its own UAV 104. The corresponding UAV 104 would take off and operate in advance of the paired emergency vehicle 102, when the paried emergency vehicle 102 starts an emergency response to a destination, or beginning at some point while en route (e.g., when approaching a more congested or accidental prone portion of the route).

As illustrated, emergency vehicles 102 and UAVs 104 may wirelessly communicate with each other. In embodiments, emergency vehicles 102 and UAVs 104 may further wirelessly communicate with satellites 108, e.g., to obtain global positioning system (GPS) data. In embodiments, emergency vehicles 102 and UAVs 104 may also wirelessly communicate with dispatch stations 106.

These and other aspects of UAVs 104 and emergency vehicles 102 will be further described with references to the remaining Figures.

Figure 2:
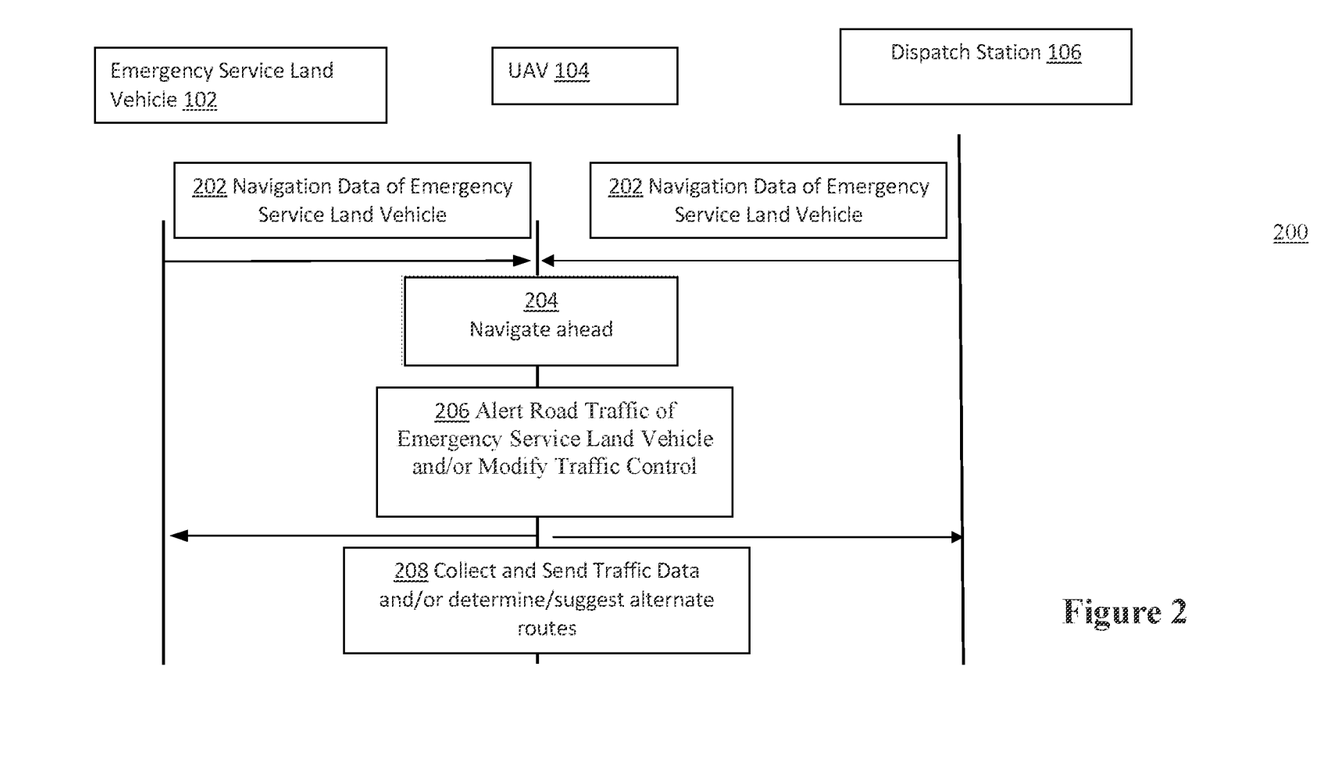
FIG. 2 illustrates an overview of the UAV assisted emergency response process of FIG. 1, according to some embodiments.

Referring now to FIG. 2, wherein an overview of the UAV assisted emergency response process of FIG. 1, according to some embodiments, is illustrated. As shown, to assist an emergency vehicle 102, a UAV 104 may receive 202 navigation data of the emergency vehicle 102. In embodiments, the navigation data may include the destination, the planned route, the current location, speed, direction, and so forth, of the emergency vehicle 102. In embodiments, UAV 104 may receive the navigational data of emergency vehicle 102 directly from the emergency vehicle 102, or from a dispatch station 106, or both (e.g., some of the data, such as the destination and the planned route, from dispatch station 106, and other data, such as current location, speed and direction, from emergency vehicle 102).

On receipt of the navigation data of emergency vehicle 102. UAV 104 may navigate 204 in advance of emergency vehicle 102 by a pre-determined or dynamically determined amount of distance. Examples of pre-determined distance may include but are not limited to 500 feet, 1.000 feet, 5,000 feet and so forth. Dynamically determined amount of distance may be made in view of the nature of the route (rural or urban), traffic level (congested or uncongested), distance between intersections, and so forth.

As UAV 104 continuously navigates ahead of emergency vehicle 102, UAV 104 may alert 206 road traffic that are ahead of emergency vehicle 102, about pending transit of emergency vehicle 102. For example, in embodiments where UAV 104 may be equipped with sirens, horns, and emergency lights. UAV 104 may activate its sirens, horns, and/or emergency lights to draw attention of the road traffic that are ahead of emergency vehicle 102, about pending transit of emergency vehicle 102. In embodiments. UAV 104 may also modify 206 traffic controls, such as signal lights, at various intersections along the route to favor emergency vehicle 102.

In embodiments, UAV 104 may also collect 208 road traffic information and send the road traffic information back to emergency vehicle 102 and/or dispatch station 106. In embodiments, UAV 104 may also determine and suggest 208 alternate routes for emergency vehicle 102.

Figure 3:
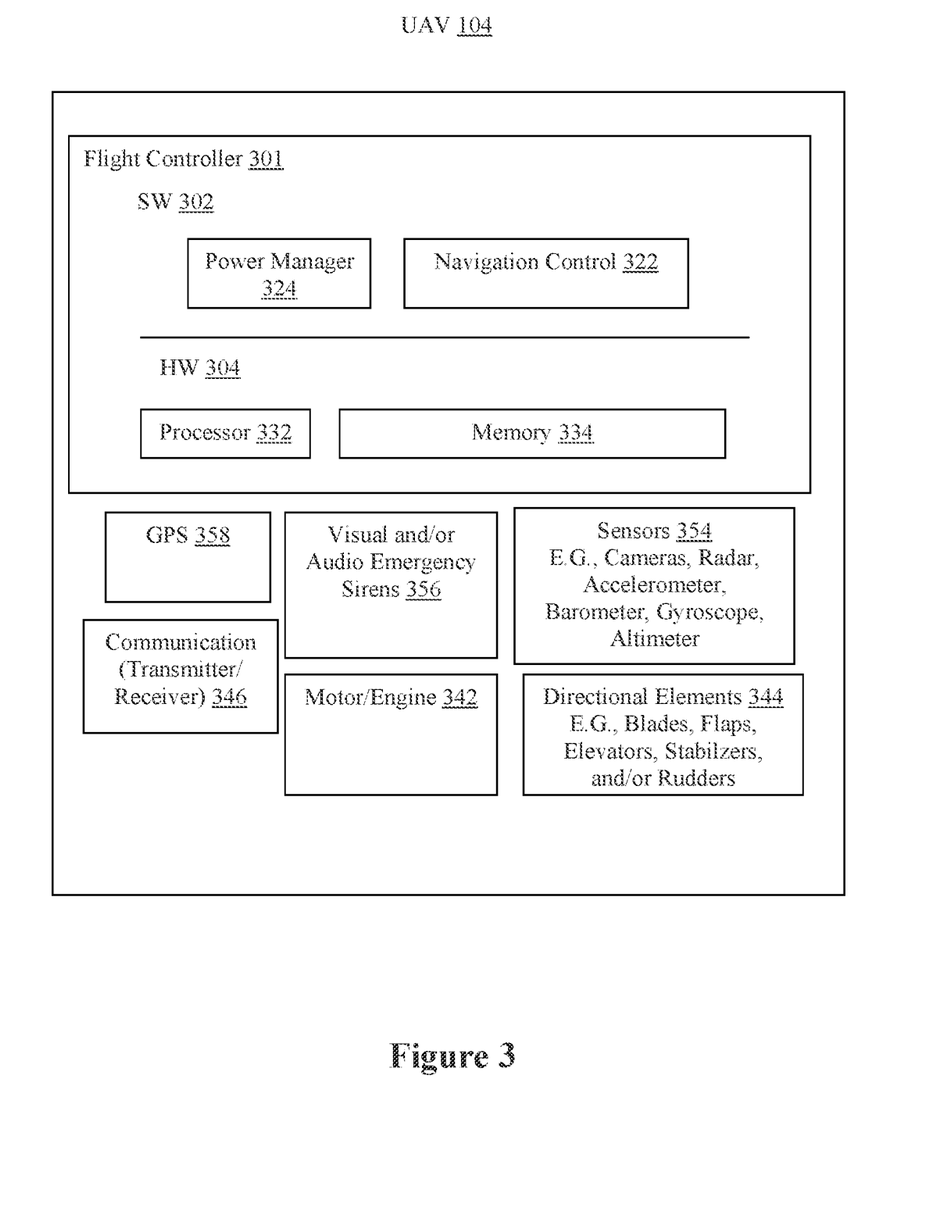
FIG. 3 illustrates example architecture of an UAV equipped to assist emergency vehicles, according to some embodiments.

Referring now to FIG. 3, wherein example architecture of a UAV equipped to assist emergency vehicles, according to some embodiments, is illustrated. As shown, UAV 104 may comprise flight controller 301. GPS 358, visual and/or audio emergency sirens 356, sensors 354, communication interface 346, motor/engine 342 and directional elements 344.

GPS 358 may be configured to communicate with GPS satellites to obtain and provide GPS information. Visual and/or audio emergency sirens 356 may include, but are not limited to, sirens, horns, emergency lights, and so forth. Sensors 354 may include, but are not limited to cameras, radars, accelerometers, gyroscopes, barometers, altimeter, and so forth. In embodiments, cameras may include 2D, 3D, depth, and/or infrared cameras.

Communication interface 346 may include a transmitter and a receiver. In embodiments, communication interface 346 may include a transceiver. Communication interface 346 may be configured to wireless communication in any one of a number of wireless communication protocols, 3G/4G, Long Term Evolution (LTE), and/or WiFi. Communication interface 346 may be also configured to support Near Field Communication (NFC) and/or Bluetooth®.

Flight controller 301 may be configured to control navigation of UAV 104. In particular, flight controller 301 may be configured to receive navigation data of emergency vehicle 102, and in response, control motor/engine 342 and/or directional elements 344 to navigate UAV 102 ahead/in advance of emergency vehicle 102 by a pre-determined or dynamically determined amount of distance, as described earlier. In various copter embodiments, flight controller 301 may be configured to provide relative control to motor 342 to provide the desired roll, pitch and/or yaw to navigate UAV 104. In various winged embodiments, flight controller 301 may be configured to provide control to engine 342 and directional elements 344 such as flaps, elevators, stabilizers and/or rudders to provide the desired roll, pitch and/or yaw to navigate UAV 104.

In embodiments, flight controller 301 may be further configured to activate visual and/or audio emergency sirens 356 to alert road traffics that are ahead of emergency vehicle 102, about pending transit of emergency vehicle 102. In embodiments, flight controller 301 may be further configured to use communication interface 346 to modify traffic control along the route to favor emergency vehicle 102.

In embodiments, flight controller 301 may be further configured to activate cameras, and/or radar to collect traffic information ahead of emergency vehicle 102, and send the collected traffic information back to emergency vehicle 102. In embodiments, flight controller 301 may be further configured to use GPS information to determine and suggest alternate routes, in view of the collected traffic information, for emergency vehicle 102.

In embodiments, flight controller 302 may be implemented in hardware e.g., an ASIC embodied with circuitry that provides the described functions, or a programmable logic device, such as an FPGA programmed with logic to provide the described functions.

In embodiments, flight controller 301 may be implemented with hardware/software combination, such as software 302 and hardware 304. Hardware 304 may include processor 332 having one or more processor cores, and memory 334 which may be any non-volatile storage. Software 302 may include e.g., power manager 324 configured to manage power distribution and consumption of the various components of UAV 104, and navigation control 322. Navigation control 322 may include machine instructions that provide the described functions of flight controller 301, when executed by processor 332. The machine instruction may be generated from an assembler and/or compiled from a high level language compiler.

Figure 4:
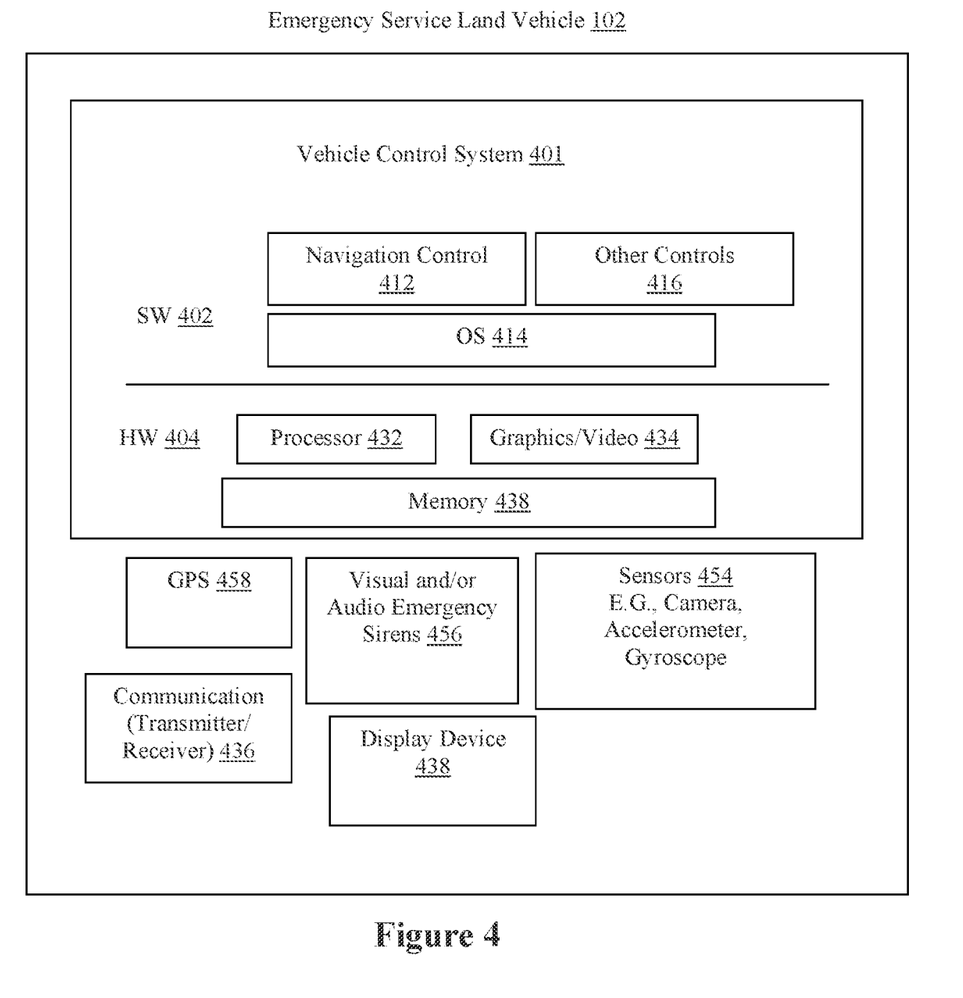
FIG. 4 illustrates example architecture of an emergency vehicle equipped to be assisted by an UAV, according to some embodiments.

Referring now to FIG. 4, wherein example architecture of an emergency vehicle equipped to be assisted by an UAV, according to some embodiments, is illustrated. As shown, emergency vehicle 102 equipped to be assisted by an UAV may comprise vehicle control system 401, GPS 458, visual and/or audio emergency sirens 456, sensors 454, communication interface 436, and display device 438.

GPS 458 may be configured to communicate with GPS satellites to obtain and provide GPS information. Visual and/or audio emergency sirens 456 may include, but are not limited to, sirens, horns, emergency lights, and so forth. Sensors 454 may include, but are not limited to cameras, accelerometers, gyroscopes, and so forth. In embodiments, cameras may include 2D, 3D, depth, and/or infrared cameras.

Communication interface 436 may include a transmitter and a receiver. In embodiments, communication interface 436 may include a transceiver. Communication interface 436 may be configured to facilitate radio/voice communication (which may be amplitude, angle, frequency or phase modulated). Communication interface 436 may be configured to wirelessly communicate voice and/or data in any one of a number of wireless communication protocols, 3G/4G, Long Term Evolution (LTE), and/or WiFi. Communication interface 436 may be also configured to support Near Field Communication (NFC) and/or Bluetooth®.

Display device 438 may be configured to display information, including but are not limited to road traffic information and/or suggested alternate routes provided by UAV 104.

Vehicle control system 401 may be configured to cooperate with UAV 104 to receive assistance form UAV 104. In particular, vehicle control system 401 may be configured to provide navigation data of emergency vehicle 102 to UAV 104 and/or dispatch station 106. In embodiments, vehicle control system 401 may be further configured to activate visual and/or audio emergency sirens 456 to alert road traffics of emergency vehicle 102. In embodiments, vehicle control system 401 may be further configured to activate cameras to collect traffic information around emergency vehicle 102, and send the collected traffic information back to dispatch station 106. In embodiments, vehicle control system 401 may be further configured to receive collected road traffic information and/or suggested alternate routes from UAV 104, and display the received road traffic information and/or suggested alternate routes on display device 438.

In embodiments, vehicle control system 401 may be implemented in hardware e.g., an ASIC embodied with circuitry that provides the described functions, or a programmable logic device, such as an FPGA programmed with logic to provide the described functions.

In embodiments, vehicle control system 401 may be implemented with hardware/software combination, such as software 402 and hardware 404. Hardware 404 may include processor 432 having one or more processor cores, and memory 438 which may be any non-volatile storage. Further, hardware 404 may include graphics/video hardware assist co-processors. Software 402 may include operating system (OS) 414 configured to manage allocation and usage of hardware 404, which may be any OS known in the art. Software 402 may further include navigation control 412, which may include machine instructions that provide the described functions of vehicle control system 401, when executed by processor 432. The machine instruction may be generated from an assembler and/or compiled from a high level language compiler. In embodiments, software 402 may include other vehicle controls 416. Examples of other vehicle controls 416 may include but are not limited, various navigation assistance, such as, route planning, landmarks/points of interest location, fuel consumption/efficiency management and reporting, radio communications, and so forth.

Figure 5:
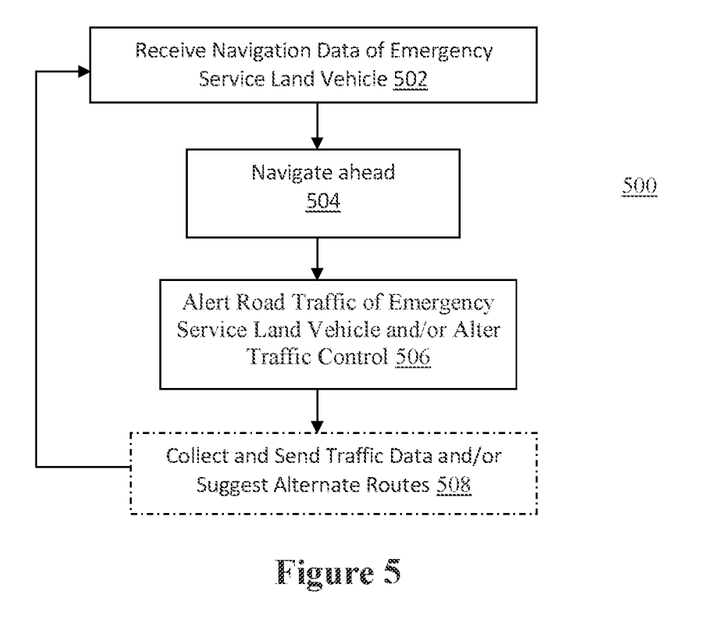
FIG. 5 illustrates an example navigation control process of an UAV for assisting emergency vehicles, according to some embodiments.

Referring now to FIG. 5, wherein an example navigation control process of a UAV for assisting emergency vehicles, according to some embodiments, is shown. As illustrated, navigation control process 500 for a UAV for assisting emergency vehicles may comprise operations to be performed at blocks 502-508. The process may be performed e.g., by navigation control 322 of flight controller 301 of UAV 104. Accordingly, FIG. 5 also depicts the algorithmic structure of navigation control 322.

Process 500 may begin at block 502. At block 502, navigation data of an emergency vehicle receiving assistance may be received. As described earlier, the navigation data may be received from the emergency vehicle and/or a dispatch station. Next at block 504, the UAV may be caused to navigate ahead/in advance of the emergency vehicle by a pre-determined or dynamically determined amount of distance.

At block 506, road traffics that are ahead of the emergency vehicle may be alerted, e.g., via activation of visual and/or audio emergency sirens, of pending transit of the emergency vehicle. Additionally or in the alternative, traffic controls along the route, ahead of the emergency vehicle may be modified to favor the emergency vehicle.

In embodiments, at block 508, road traffic information along the route ahead of the emergency vehicle may be optionally collected, e.g., via activation of cameras and/or radar, and provided to the emergency vehicle. Further, alternate routes may be optionally determined and suggested to the emergency vehicle.

From block 508, process 500 may return to block 502 and continue therefrom as earlier described. The operations at blocks 502-508 may be iterated as many times as necessary to provide the assistance until the emergency vehicle reaches the destination. At such time, UAV 104 may return to a based station or the corresponding emergency vehicle.

Figure 6:
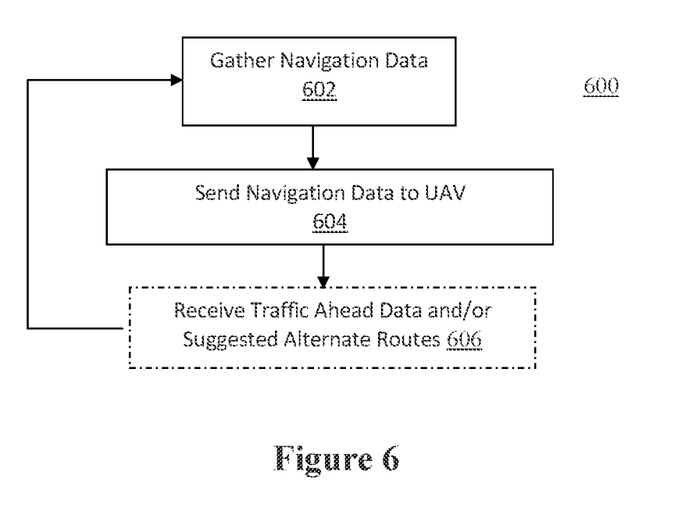
FIG. 6 illustrates an example navigation control process of an emergency vehicle for receiving assistance from an UAV, according to some embodiments.

Referring now to FIG. 6, wherein an example navigation control process of an emergency vehicle for receiving assistance from an UAV, according to some embodiments, is shown. As illustrated, navigation control process 600 for an emergency vehicle receiving assistance from an UAV may comprise operations to be performed at blocks 602-606. The process may be performed e.g., by navigation control 412 of vehicle control system 401 of emergency vehicle 102. Accordingly, FIG. 6 also depicts the algorithmic structure of navigation control 412.

Process 600 may begin at block 602. At block 602, navigation data of the emergency vehicle to receive assistance may be collected. As described earlier, the navigation data may include destination, route, current location, current speed, current direction, and so forth. Next at block 604, the navigation data may be sent to the assisting UAV directly or via a dispatch station.

At block 606, information about road traffics that are ahead of the emergency vehicle and/or suggested alternate routes may be optionally received from the assisting UAV. If received, the received information and/or suggestion may be displayed on a display device of the emergency vehicle.

From block 606, process 600 may return to block 602 and continue therefrom as earlier described. The operations at blocks 602-608 may be iterated as many times as necessary to receive assistance from the UAV until the emergency vehicle reaches the destination.

Referring back to FIG. 2, in alternate embodiments, at block 202, in lieu of receiving navigation data of emergency vehicle 102 from either the emergency vehicle 102 itself or from a dispatch station 106, UAV 104 may receive a destination from either the emergency vehicle 102 itself or from a dispatch station 106 instead. For these embodiments, UAV 104 may determine the route to the destination, and at block 204, as it navigates ahead of emergency 102, provide guidance to emergency vehicle 102, leading emergency vehicle 102 to the destination. In embodiments, guidance may include, but are not limited to, electronic or audio route information transmitted to emergency vehicle 102 for display or play, or visual guidance such as lighting the route to be followed for emergency vehicle 102.

Referring also to FIGS. 5 and 6, thus for these embodiments, at block 502 of process 500) for a UAV to assist an emergency vehicle, the operations may include receiving the destination of the emergency vehicle instead, and at block 504, the operations may include determining the route to the destination, and providing guidance to the emergency vehicle leading the emergency vehicle to the destination, with electronic, audio and/or visual guidance. For process 600, for an emergency vehicle to receive assistance from an UAV, operations at blocks 602 and 604 may be skipped, and operations at block 606 may include receiving the electronic and/or audio guidance to the destination from the UAV, and rendering and/or playing the electronic and/or audio guidance to follow to en route to the destination.

Figure 7:
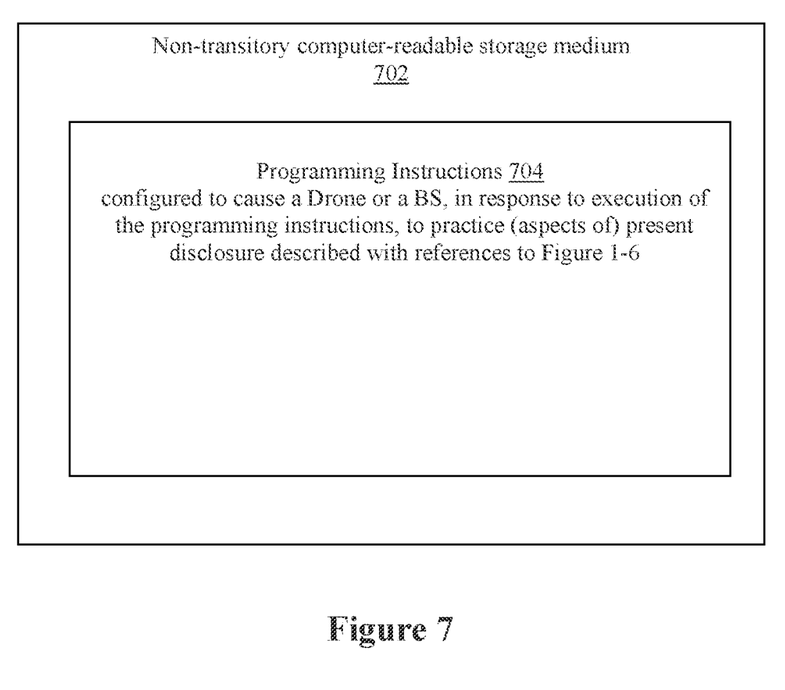
FIG. 7 illustrates an example computer-readable storage medium with instructions configured to enable an UAV or an emergency vehicle to practice aspects of the present disclosure, in accordance with various embodiments.

FIG. 7 illustrates an example non-transitory computer-readable storage medium having instructions configured to practice all or selected ones of the operations associated with emergency vehicle 102 and UAV 104, earlier described, in accordance with various embodiments. As illustrated, non-transitory computer-readable storage medium 702 may include a number of programming instructions 704. Programming instructions 704 may be configured to enable an apparatus, e.g., flight controller 301 of UAV 104 and/or vehicle control system 401 of emergency vehicle 102, in response to execution of the programming instructions, to perform various UAV and/or emergency vehicle operations earlier described. In alternate embodiments, programming instructions 704 may be disposed on multiple non-transitory computer-readable storage media 702 instead. In still other embodiments, programming instructions 704 may be encoded in transitory computer readable signals.

Referring also to FIGS. 3 and 4, for some embodiments, at least one of processors 332 or 432 may be packaged together with a computer-readable storage medium having programming instructions 704 configured to practice all or selected aspects of flight controller 301 of UAV 104 and/or vehicle control system 401 of emergency vehicle 102. For one embodiment, at least one of processors 332 or 432 may be packaged together with a computer-readable storage medium having programming instructions 704 to form a System in Package (SiP). For one embodiment, at least one of processors 332 or 432 may be integrated on the same die with a computer-readable storage medium having programming instructions 704. For one embodiment, at least one of processors 332 or 432 may be packaged together with a computer-readable storage medium having programming instructions 704 to form a System on Chip (SoC).

Example 1 may be an unmanned aerial vehicle (UAV), comprising: a transmitter-receiver arrangement to transmit and receive communication signals; one or more engines to provide propulsive force for the UAV; and a flight controller coupled to the transmitter-receiver arrangement and the one or more engines to control at least the one or more engines to navigate the UAV to condition road traffic for an emergency service land vehicle on emergency en route to a destination, wherein to condition road traffic, the flight controller may receive via the transmitter-receiver arrangement navigation data of the emergency service land vehicle, and in response, control at least the one or more engines to navigate the UAV in advance of the emergency service land vehicle, to at least alert road traffics ahead of the emergency service land vehicle of pending transit of the emergency service land vehicle.

Example 2 may be example 1, wherein the flight controller may control at least the one or more engines to navigate the UAV in advance of the emergency service land vehicle by a determined amount of distance.

Example 3 may be example 1, wherein the navigation data may include one or more of destination, current location, speed, or direction of the emergency service land vehicle.

Example 4 may be example 1, wherein the flight controller may receive the navigation data of the emergency service land vehicle from the emergency service land vehicle.

Example 5 may be example 1, wherein the flight controller may receive the navigation data of the emergency service land vehicle from a dispatch station with access to or in receipt of the navigation data of the emergency service land vehicle.

Example 6 may be example 1, further comprising audio or visual emergency sirens, and wherein to alert road traffics, the flight controller may activate the audio or visual emergency sirens.

Example 7 may be example 1, wherein the flight controller may further modify traffic controls along the route ahead of the emergency service land vehicle to favor the emergency service land vehicles.

Example 8 may be example 1, further comprising one or more cameras, radars, sonic or infrared sensors, and wherein the flight controller may further collect road traffic information ahead of the emergency service land vehicle, using the one or more cameras, radars, sonic or infrared sensors, and report the road traffic information to the emergency service land vehicle directly or via a dispatch station.

Example 9 may be example 1, wherein the flight controller may further recommend an alternate route to the emergency service land vehicle.

Example 10 may be example 1, further comprising a geographic positioning system (GPS) to receive GPS information from one or more satellites, and wherein the flight controller may control the one or more engines to navigate the UAV ahead of the emergency service land vehicle further based on the GPS information.

Example 11 may be example 1-10, wherein the UAV is a dual copter, a tricopter or a quadcopter; wherein the one or more engines may comprise two, three or four motors, and wherein to control at least the one or more engines to navigate the UAV in advance of the emergency service land vehicle, the flight controller may control an amount of propulsion provided by each of the two, three or four motors that may include controlling the two, three or four motors to provide different amounts of propulsion to provide a desired roll, pitch or yaw for the UAV.

Example 12 may be any one of examples 1-10, wherein the one or more engines may comprise a jet engine, and the UAV may comprise one or more stabilizers, one or more flaps, one or more elevators and a rudder; and wherein to control at least the one or more engines to navigate the UAV in advance of the emergency service land vehicle, the flight controller may control an amount of jet propulsion provided by the jet engine, and to control one or more of the one or more stabilizers, the one or more flaps, the one or more elevators and the rudder to provide a desired roll, pitch or yaw for the UAV.

Example 13 may be any one of examples 1-10, wherein the emergency service land vehicle may be a selected one of a fire, a police, or an ambulance land vehicle.

Example 14 may be an emergency service land vehicle, comprising: a transmitter-receiver arrangement to transmit and receive communication signals; and a vehicle control system coupled to the transmitter-receiver arrangement to use an unmanned aerial vehicle (UAV) to condition road traffic for the emergency service land vehicle when it is on an emergency en route to a destination; wherein to use the UAV to condition road traffic, the vehicle control system may transmit, via the transmitter-receiver arrangement, navigation data of the emergency service land vehicle to the UAV, directly or a via a dispatch center: wherein in response, the UAV may navigate the UAV in advance of the emergency service land vehicle, to at least alert road traffics ahead of the emergency service land vehicle of pending transit of the emergency service land vehicle.

Example 15 may be example 14, wherein the navigation data may include one or more of destination, current location, speed, or direction of the emergency service land vehicle.

Example 16 may be example 14 or 15, further comprising a display device, wherein the vehicle control system may further receive from the UAV traffic data ahead of the emergency service land vehicle collected by the UAV; and wherein the vehicle control system may further display the traffic data on the display device.

Example 17 may be example 16, wherein the vehicle control system may further receive from the UAV alternate route recommendations; and wherein the vehicle control system may further display the alternate route recommendations on the display device.

Example 18 may be a method for operating an unmanned aerial vehicle (UAV), comprising: receiving, by the UAV, navigation data associated with an emergency service land vehicle on emergency en route to a destination; and controlling, by the UAV, one or more engines of the UAV to navigate the UAV in advance of the emergency service land vehicle to condition road traffic, based at least in part on the navigation data received, including at least alerting road traffics ahead of the emergency service land vehicle of pending transit of the emergency service land vehicle.

Example 19 may be example 18, wherein controlling may comprise controlling at least the one or more engines to navigate the UAV in advance of the emergency service land vehicle by a determined amount of distance.

Example 20 may be example 18, wherein receiving may comprise receiving the navigation data of the emergency service land vehicle from the emergency service land vehicle.

Example 21 may be example 18, wherein receiving may comprise receiving the navigation data of the emergency service land vehicle from a dispatch station with access to or in receipt of the navigation data of the emergency service land vehicle.

Example 22 may be example 18, wherein the UAV may comprise audio or visual emergency sirens, and wherein alerting road traffics may comprise activating the audio or visual emergency sirens.

Example 23 may be example 18, further comprising modifying, by the UAV, traffic controls along the route ahead of the emergency service land vehicle to favor the emergency service land vehicles.

Example 24 may be example 18, further comprising one or more cameras, radars, sonic or infrared sensors, and wherein the method may further comprise collecting, by the UAV, road traffic information ahead of the emergency service land vehicle, using the one or more cameras, radars, sonic or infrared sensors, and reporting the road traffic information to the emergency service land vehicle directly or via a dispatch station.

Example 25 may be example 18, further comprising recommending an alternate route to the emergency service land vehicle.

Example 26 may be example 18, further comprising a geographic positioning system (GPS) to receive GPS information from one or more satellites, and wherein controlling may comprise controlling the one or more engines to navigate the UAV ahead of the emergency service land vehicle further based on the GPS information.

Example 27 may be any one of examples 18-26, wherein the UAV is a dual copter, a tricopter or a quadcopter; wherein the one or more engines may comprise two, three or four motors, and wherein controlling at least the one or more engines to navigate the UAV in advance of the emergency service land vehicle may comprise controlling an amount of propulsion provided by each of the two, three or four motors that may include controlling the two, three or four motors to provide different amounts of propulsion to provide a desired roll, pitch or yaw for the UAV.

Example 28 may be any one of examples 18-26, wherein the one or more engines may comprise a jet engine, and the UAV may comprise one or more stabilizers, one or more flaps, one or more elevators and a rudder; and wherein controlling at least the one or more engines to navigate the UAV in advance of the emergency service land vehicle may comprise controlling an amount of jet propulsion provided by the jet engine, and controlling one or more of the one or more stabilizers, the one or more flaps, the one or more elevators and the rudder to provide a desired roll, pitch or yaw for the UAV.

Example 29 may be a method for operating an emergency service land vehicle, comprising: collecting, by an emergency service land vehicle, navigation data of the emergency service land vehicle while on an emergency en route to a destination; and transmitting, by the emergency service land vehicle, the navigation data to an unmanned aerial vehicle (UAV) directly or via a dispatch station, for use by the UAV to navigate in advance of the emergency service land vehicle to condition road traffic for the emergency service land vehicle, wherein to condition road traffic may include to at least alert road traffics ahead of the emergency service land vehicle of pending transit of the emergency service land vehicle.

Example 30 may be example 29, further comprising receiving from the UAV traffic data ahead of the emergency service land vehicle collected by the UAV; and displaying the traffic data.

Example 31 may be example 29 or 30, further comprising receiving from the UAV, by the emergency service land vehicle, alternate route recommendations; and displaying the alternate route recommendations.

Example 32 may be one or more computer-readable media comprising instructions that cause an unmanned aerial vehicle (UAV), in response to execution of the instructions by one or more processors of the UAV, to condition road traffic for an emergency service land vehicle on emergency en route to a destination; wherein to condition road traffic, the UAV is caused to receive navigation data of the emergency service land vehicle, and in response, control one or more engines of the UAV to navigate the UAV in advance of an emergency service land vehicle, based at least in part on the navigation data received, to at least alert road traffics ahead of the emergency service land vehicle of pending transit of the emergency service land vehicle.

Example 33 may be example 32, wherein the UAV may control at least the one or more engines to navigate the UAV in advance of the emergency service land vehicle by a determined amount of distance.

Example 34 may be example 32, wherein the navigation data may include one or more of destination, current location, speed, or direction of the emergency service land vehicle.

Example 35 may be example 32, wherein the UAV may be caused to receive the navigation data of the emergency service land vehicle from the emergency service land vehicle.

Example 30 may be example 32, wherein the UAV may be caused to receive the navigation data of the emergency service land vehicle from a dispatch station with access to or in receipt of the navigation data of the emergency service land vehicle.

Example 37 may be example 32, wherein the UAV may further comprise audio or visual emergency sirens, and wherein to alert road traffics, the UAV is caused to activate the audio or visual emergency sirens.

Example 38 may be example 32, wherein the UAV may be further caused to modify traffic controls along the route ahead of the emergency service land vehicle to favor the emergency service land vehicles.

Example 39 may be example 32, wherein the UAV may further comprise one or more cameras, radars, sonic or infrared sensors, and wherein the UAV may be further caused to collect road traffic information ahead of the emergency service land vehicle, using the one or more cameras, radars, sonic or infrared sensors, and report the road traffic information to the emergency service land vehicle directly or via a dispatch station.

Example 40 may be example 32, wherein the UAV is further caused to recommend an alternate route to the emergency service land vehicle.

Example 41 may be example 32, wherein the UAV may further comprise a geographic positioning system (GPS) to receive GPS information from one or more satellites, and wherein the UAV is further caused to control the one or more engines to navigate the UAV ahead of the emergency service land vehicle further based on the GPS information.

Example 42 may be any one of examples 32-41, wherein the UAV is a dual copter, a tricopter or a quadcopter; wherein the one or more engines may comprise two, three or four motors, and wherein to control at least the one or more engines to navigate the UAV in advance of the emergency service land vehicle, the UAV is further caused to control an amount of propulsion provided by each of the two, three or four motors that may include controlling the two, three or four motors to provide different amounts of propulsion to provide a desired roll, pitch or yaw for the UAV.

Example 42 may be any one of examples 32-41, wherein the one or more engines may comprise a jet engine, and the UAV may comprise one or more stabilizers, one or more flaps, one or more elevators and a rudder; and wherein to control at least the one or more engines to navigate the UAV in advance of the emergency service land vehicle, the UAV is further caused to control an amount of jet propulsion provided by the jet engine, and to control one or more of the one or more stabilizers, the one or more flaps, the one or more elevators and the rudder to provide a desired roll, pitch or yaw for the UAV.

Example 44 may be one or more computer-readable media comprising instructions that cause an emergency service land vehicle, in response to execution of the instructions by one or more processors of the emergency service land vehicle, to collect navigation data of the emergency service land vehicle while on an emergency en route to a destination; and transmit the navigation data to an unmanned aerial vehicle (UAV) directly or via a dispatch station, for use by the UAV to navigate in advance of the emergency service land vehicle to condition road traffic for the emergency service land vehicle; wherein to condition road traffic may include to at least alert road traffics ahead of the emergency service land vehicle of pending transit of the emergency service land vehicle.

Example 45 may be example 44, wherein the navigation data may include one or more of destination, current location, speed, or direction of the emergency service land vehicle.

Example 46 may be example 44 or 45, wherein the emergency service land vehicle may further comprise a display device, wherein the emergency service land vehicle may further receive from the UAV traffic data ahead of the emergency service land vehicle collected by the UAV; and wherein the emergency service land vehicle may further display the traffic data on the display device.

Example 47 may be example 46, wherein the emergency service land vehicle may further receive from the UAV alternate route recommendations; and wherein the emergency service land vehicle may further display the alternate route recommendations on the display device.

Example 48 may be an apparatus of unmanned aerial operation, comprising means for receiving, by the apparatus, navigation data associated with an emergency service land vehicle on emergency en route to a destination; and means for controlling, by the apparatus, one or more engines of the apparatus to navigate the apparatus in advance of the emergency service land vehicle to condition road traffic, based at least in part on the navigation data received, including at least alerting road traffics ahead of the emergency service land vehicle of pending transit of the emergency service land vehicle.

Example 49 may be example 48, wherein means for controlling may comprise means for controlling at least the one or more engines to navigate the apparatus in advance of the emergency service land vehicle by a determined amount of distance.

Example 50 may be example 48, wherein means for receiving may comprise means for receiving the navigation data of the emergency service land vehicle from the emergency service land vehicle.

Example 51 may be example 48, wherein means for receiving may comprise means for receiving the navigation data of the emergency service land vehicle from a dispatch station with access to or in receipt of the navigation data of the emergency service land vehicle.

Example 52 may be example 48, wherein the apparatus may comprise audio or visual emergency sirens, and wherein means for alerting road traffics may comprise means for activating the audio or visual emergency sirens.

Example 53 may be example 48, further comprising means for modifying traffic controls along the route ahead of the emergency service land vehicle to favor the emergency service land vehicles.

Example 54 may be example 48, further comprising one or more cameras, radars, sonic or infrared sensors, and wherein the apparatus may further comprise means for collecting road traffic information ahead of the emergency service land vehicle, using the one or more cameras, radars, sonic or infrared sensors, and means for reporting the road traffic information to the emergency service land vehicle directly or via a dispatch station.

Example 55 may be example 48, further comprising means for recommending an alternate route to the emergency service land vehicle.

Example 56 may be example 48, wherein the apparatus may further comprise a geographic positioning system (GPS) to receive GPS information from one or more satellites, and wherein means for controlling may comprise means for controlling the one or more engines to navigate the UAV ahead of the emergency service land vehicle further based on the GPS information.

Example 57 may be any one of examples 48-56, wherein the apparatus is a dual copter, a tricopter or a quadcopter; wherein the one or more engines may comprise two, three or four motors, and wherein means for controlling at least the one or more engines to navigate the apparatus in advance of the emergency service land vehicle may comprise means for controlling an amount of propulsion provided by each of the two, three or four motors that may include controlling the two, three or four motors to provide different amounts of propulsion to provide a desired roll, pitch or yaw for the apparatus.

Example 58 may be any one of examples 48-56, wherein the one or more engines may comprise a jet engine, and the apparatus may comprise one or more stabilizers, one or more flaps, one or more elevators and a rudder; and wherein means for controlling at least the one or more engines to navigate the apparatus in advance of the emergency service land vehicle may comprise means for controlling an amount of jet propulsion provided by the jet engine, and controlling one or more of the one or more stabilizers, the one or more flaps, the one or more elevators and the rudder to provide a desired roll, pitch or yaw for the apparatus.

Example 59 may be an emergency service land apparatus, comprising: means for collecting, by the apparatus, to collect navigation data of the emergency service land vehicle while on an emergency en route to a destination; and means for transmitting, by the apparatus, the navigation data to an unmanned aerial vehicle (UAV) directly or via a dispatch station, for use by the UAV to navigate in advance of the emergency service land vehicle to condition road traffic for the emergency service land vehicle; wherein to condition road traffic may include to at least alert road traffics ahead of the emergency service land vehicle of pending transit of the emergency service land vehicle.

Example 60 may be example 59, further comprising means for receiving from the UAV traffic data ahead of the emergency service land vehicle collected by the UAV; and means for displaying the traffic data.

Example 61 may be example 59 or 60, further comprising means for receiving from the UAV alternate route recommendations; and means for displaying the alternate route recommendations.

Example 62 may be example 1, wherein the flight controller may receive via the transmitter-receiver arrangement a destination of the emergency service land vehicle instead, and in response, may further determine a route to the destination, and provide electronic, audio or visual guidance to guide the emergency service land vehicle to the destination.

Example 63 may be example 18, wherein receiving may comprise receiving a destination of the emergency service land vehicle instead; and the method may further comprises determining a route to the destination, and providing electronic, audio or visual guidance to guide the emergency service land vehicle to the destination.

Example 64 may be example 32, wherein to receive may comprise to receive a destination of the emergency service land vehicle instead, and wherein the UAV may be further caused to determine a route to the destination, and provide electronic, audio or visual guidance to guide the emergency service land vehicle to the destination.

Example 65 may be example 48, wherein means for receiving are for receiving a destination of the emergency service land vehicle instead; and wherein the apparatus further comprises means for determining a route to the destination, and means for providing electronic, audio or visual guidance to guide the emergency service land vehicle to the destination.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An unmanned aerial vehicle (UAV), comprising:
a transmitter-receiver arrangement to transmit and receive communication signals;
one or more engines to provide propulsive force for the UAV; and
a flight controller coupled to the transmitter-receiver arrangement and the one or more engines to control at least the one or more engines to navigate the UAV to condition road traffic for an emergency service land vehicle on emergency en route to a destination, wherein to condition road traffic, the flight controller is to receive via the transmitter-receiver arrangement navigation data of the emergency service land vehicle, and in response, control at least the one or more engines to navigate the UAV in advance of the emergency service land vehicle, to at least alert road traffics ahead of the emergency service land vehicle of pending transit of the emergency service land vehicle, wherein the flight controller is to further modify traffic control signal lights along the route ahead of the emergency service land vehicle to favor the emergency service land vehicles.

2. The UAV of claim 1, wherein the flight controller is to control at least the one or more engines to navigate the UAV in advance of the emergency service land vehicle by a determined amount of distance.

3. The UAV of claim 1, wherein the navigation data include one or more of destination, current location, speed, or direction of the emergency service land vehicle.

4. The UAV of claim 1, wherein the flight controller is to receive the navigation data of the emergency service land vehicle from the emergency service land vehicle.

5. The UAV of claim 1, wherein the flight controller is to receive the navigation data of the emergency service land vehicle from a dispatch station with access to or in receipt of the navigation data of the emergency service land vehicle.

6. The UAV of claim 1, further comprising audio or visual emergency sirens, and wherein to alert road traffics, the flight controller is to activate the audio or visual emergency sirens.

7. The UAV of claim 1, further comprising one or more radars, sonic or infrared sensors, and wherein the flight controller is to further collect road traffic information ahead of the emergency service land vehicle, using the one or more radars, sonic or infrared sensors, and report the road traffic information to the emergency service land vehicle directly or via a dispatch station.

8. The UAV of claim 1, wherein the flight controller is to further recommend an alternate route to the emergency service land vehicle.

9. The UAV of claim 1, further comprising a geographic positioning system (GPS) to receive GPS information from one or more satellites, and wherein the flight controller is to control the one or more engines to navigate the UAV ahead of the emergency service land vehicle further based on the GPS information.

10. The UAV of claim 1, wherein the UAV is a dual copter, a tricopter or a quadcopter; wherein the one or more engines comprise two, three or four motors, and wherein to control at least the one or more engines to navigate the UAV in advance of the emergency service land vehicle, the flight controller is to control an amount of propulsion provided by each of the two, three or four motors that includes controlling the two, three or four motors to provide different amounts of propulsion to provide a desired roll, pitch or yaw for the UAV.

11. The UAV of claim 1, wherein the one or more engines comprises a jet engine, and the UAV comprises one or more stabilizers, one or more flaps, one or more elevators and a rudder; and wherein to control at least the one or more engines to navigate the UAV in advance of the emergency service land vehicle, the flight controller is to control an amount of jet propulsion provided by the jet engine, and to control one or more of the one or more stabilizers, the one or more flaps, the one or more elevators and the rudder to provide a desired roll, pitch or yaw for the UAV.

12. The UAV of claim 1, wherein the emergency service land vehicle is a selected one of a fire, a police, or an ambulance land vehicle.

13. An emergency service land vehicle, comprising:
a transmitter-receiver arrangement to transmit and receive communication signals; and a vehicle control system coupled to the transmitter-receiver arrangement to use an unmanned aerial vehicle (UAV) to condition road traffic for the emergency service land vehicle when it is on an emergency en route to a destination; wherein to use the UAV to condition road traffic, the vehicle control system is to transmit, via the transmitter-receiver arrangement, navigation data of the emergency service land vehicle to the UAV, directly or a via a dispatch center; wherein in response, the UAV is to navigate the UAV in advance of the emergency service land vehicle, to at least alert road traffics ahead of the emergency service land vehicle of pending transit of the emergency service land vehicle, and to further modify traffic control signal lights along the route ahead of the emergency service land vehicle to favor the emergency service land vehicle.

14. The emergency service land vehicle of claim 13, wherein the navigation data include one or more of destination, current location, speed, or direction of the emergency service land vehicle.

15. The emergency service land vehicle of claim 13, further comprising a display device, wherein the vehicle control system is to further receive from the UAV traffic data ahead of the emergency service land vehicle collected by the UAV; and
wherein the vehicle control system is to further display the traffic data on the display device.

16. The emergency service land vehicle of claim 15, wherein the vehicle control system is to further receive from the UAV alternate route recommendations; and wherein the vehicle control system is to further display the alternate route recommendations on the display device.

17. A method for operating an unmanned aerial vehicle (UAV), comprising:
receiving, by the UAV, navigation data associated with an emergency service land vehicle on emergency en route to a destination; and
controlling, by the UAV, one or more engines of the UAV to navigate the UAV in advance of the emergency service land vehicle to condition road traffic, based at least in part on the navigation data received, including at least alerting road traffics ahead of the emergency service land vehicle of pending transit of the emergency service land vehicle, and modifying traffic control signal lights along the route ahead of the emergency service land vehicle to favor the emergency service land vehicles.

18. The method of claim 17, further comprising one or more radars, sonic or infrared sensors, and wherein the method further comprises collecting, by the UAV, road traffic information ahead of the emergency service land vehicle, using the one or more radars, sonic or infrared sensors, and reporting the road traffic information to the emergency service land vehicle directly or via a dispatch station.

19. The method of claim 17, further comprising recommending an alternate route to the emergency service land vehicle.

20. One or more non-transitory computer-readable media comprising instructions that cause an unmanned aerial vehicle (UAV), in response to execution of the instructions by one or more processors of the UAV, to condition road traffic for an emergency service land vehicle on emergency en route to a destination; wherein to condition road traffic, the UAV is caused to receive navigation data of the emergency service land vehicle, and in response, control one or more engines of the UAV to navigate the UAV in advance of an emergency service land vehicle, based at least in part on the navigation data received, to at least alert road traffics ahead of the emergency service land vehicle of pending transit of the emergency service land vehicle, wherein the UAV is further caused to modify traffic control signal lights along the route ahead of the emergency service land vehicle to favor the emergency service land vehicles.

21. The one or more non-transitory computer-readable media of claim 20, wherein the UAV further comprises audio or visual emergency sirens, and wherein to alert road traffics, the UAV is caused to activate the audio or visual emergency sirens.

22. The one or more non-transitory computer-readable media of claim 20, wherein the UAV further comprises one or more radars, sonic or infrared sensors, and wherein the UAV is further caused to collect road traffic information ahead of the emergency service land vehicle, using the one or more radars, sonic or infrared sensors, and report the road traffic information to the emergency service land vehicle directly or via a dispatch station.

23. The one or more non-transitory computer-readable media of claim 20, wherein the UAV is further caused to recommend an alternate route to the emergency service land vehicle.

* * * * *

UNITED STATES PATENT AND TRADEMARK OFFICE
CERTIFICATE OF CORRECTION

PATENT NO. : 11,056,000 B2
APPLICATION NO. : 16/307373
DATED : July 6, 2021
INVENTOR(S) : Andrew F. Lamkin et al.

Page 1 of 1

It is certified that error appears in the above-identified patent and that said Letters Patent is hereby corrected as shown below:

In the Claims

Column 16
Line 1, "...traffics..." should read – "...traffic..."
Line 7, "...vehicles." should read – "...vehicle."
Line 23, "...traffics," should read – "...traffic,"

Column 17
Line 12, "...traffics..." should read – "...traffic..."
Line 43, "...traffics..." should read – "...traffic..."
Line 48, "...vehicles." should read – "...vehicle."

Column 18
Line 24, "...traffics..." should read – "...traffic..."
Line 29, "...vehicles." should read – "...vehicle."
Line 32, "...traffics," should read – "...traffic,"

Signed and Sealed this
Seventh Day of September, 2021

Drew Hirshfeld
*Performing the Functions and Duties of the
Under Secretary of Commerce for Intellectual Property and
Director of the United States Patent and Trademark Office*